April 5, 1966  E. A. RICKLICK  3,243,894
MALT HOUSE KILN FLOOR
Filed Sept. 3, 1963  4 Sheets-Sheet 1
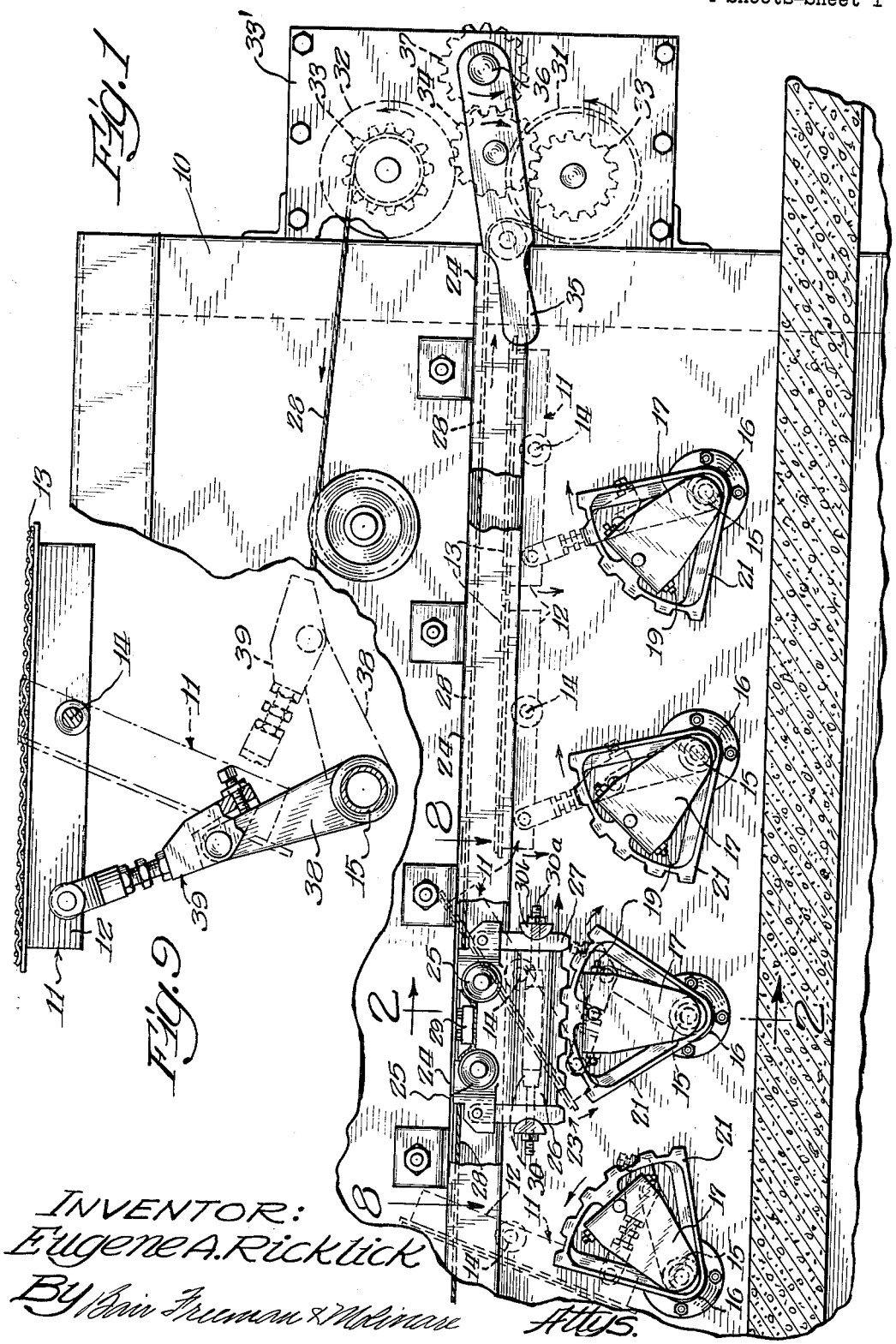
INVENTOR:
Eugene A. Ricklick
By Bair, Freeman & Molinare
Attys.

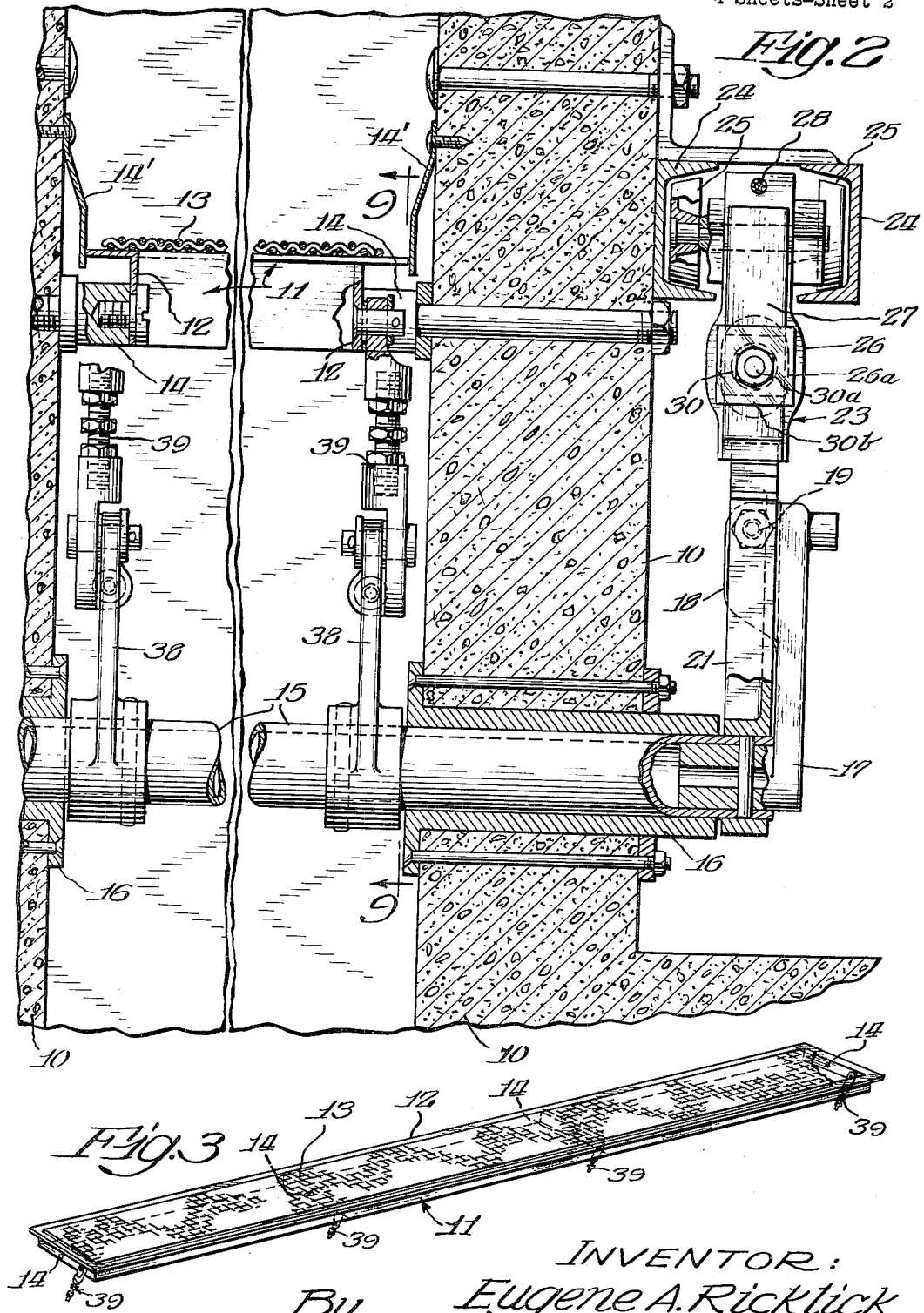

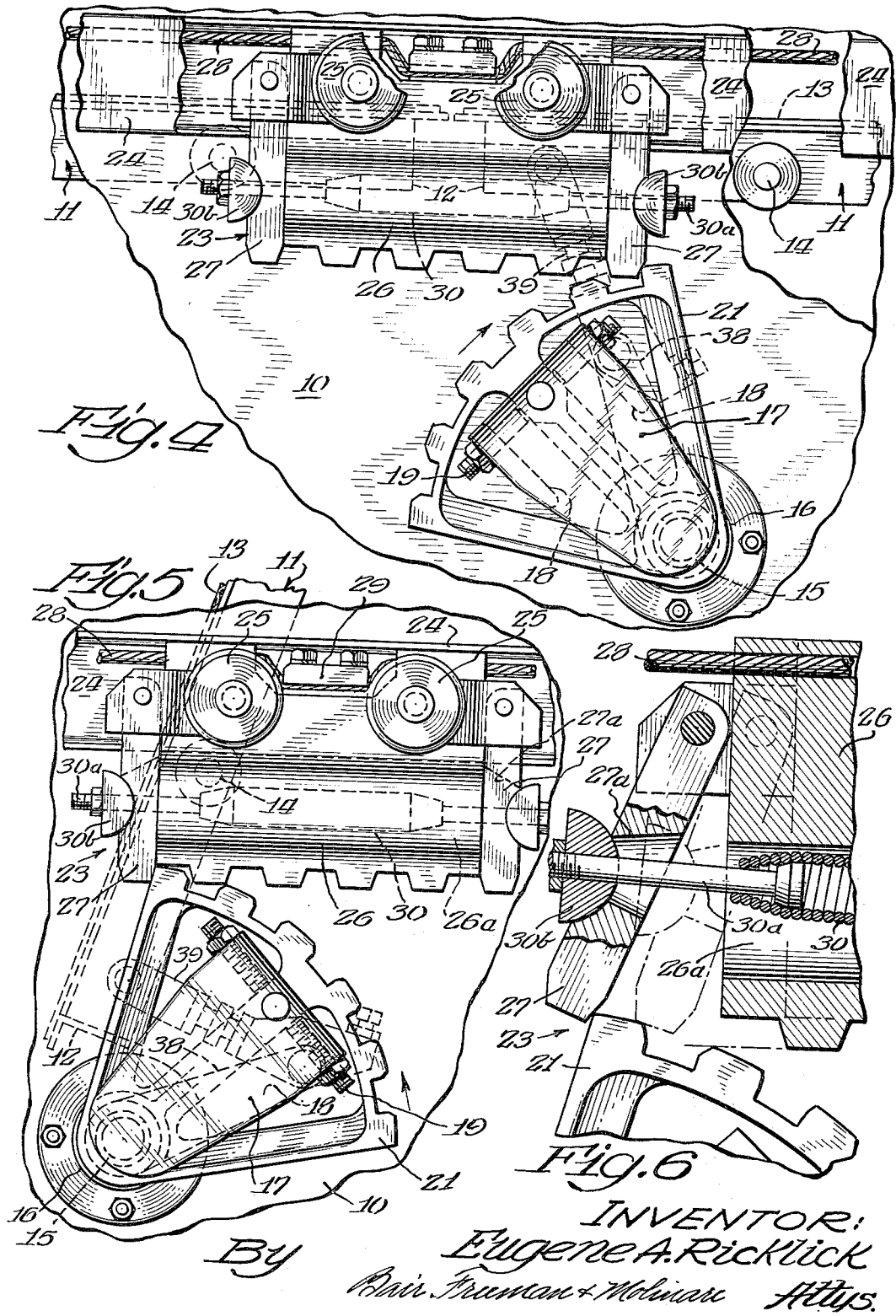

April 5, 1966 E. A. RICKLICK 3,243,894
MALT HOUSE KILN FLOOR
Filed Sept. 3, 1963 4 Sheets-Sheet 4
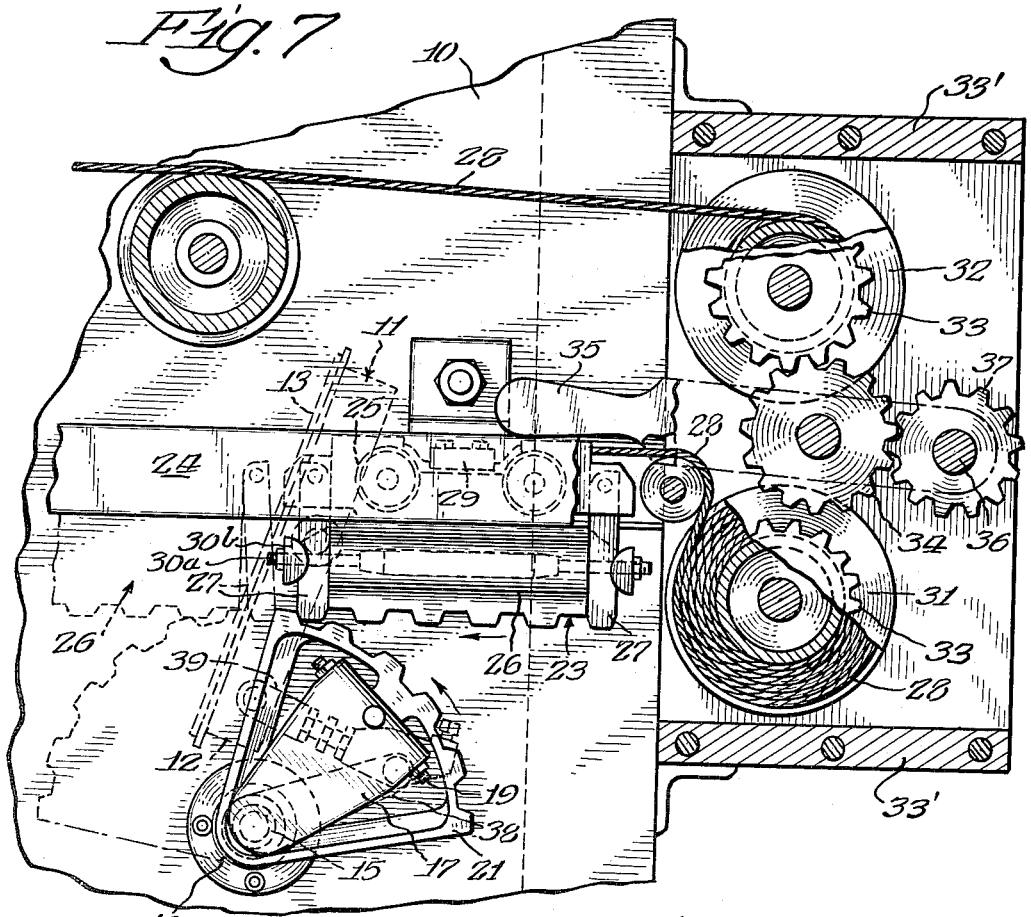
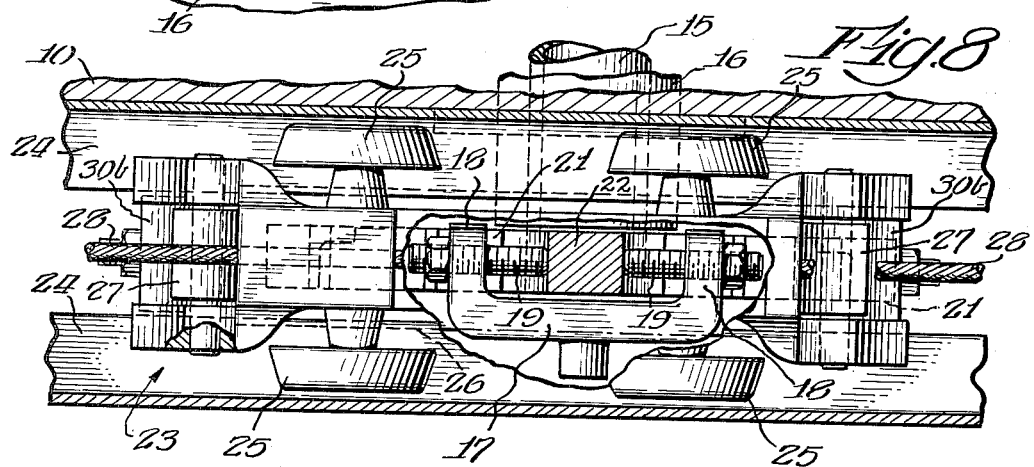
INVENTOR:
Eugene A. Ricklick
By Bair, Freeman & Molinare Attys.

3,243,894
MALT HOUSE KILN FLOOR

Eugene A. Ricklick, Minneapolis, Minn., assignor to Stockland Road Machinery Company, Hopkins, Minn., a corporation of Minnesota
Filed Sept. 3, 1963, Ser. No. 305,946
8 Claims. (Cl. 34—237)

This invention relates to a malt house kiln floor and more particularly to a dumping floor and to operating means therefor. Dump kiln floor are normally made up of sections extending across the kiln area and rotatably mounted for tilting from a horizontal closed position to a substantially vertical dumping position. Such floor sections have heretofore been turned manually for dumping and this is a very difficult and disagreeable job due to the dusty atmosphere in the kiln area during dumping.

Attempts have been made to provide power operated dumping floors but heretofore no such attempt has met with success. Such attempts have generally been predicated on simultaneous movement of the floor sections. This not only requires a high degree of power but also requires strengthening of the parts of the apparatus to withstand the imposed strains to the point where the cost was prohibitive.

It is accordingly one of the objects of the present invention to provide a malt house kiln floor in which the floor sections are moved successively between their closed and dumping positions by power operated devices.

According to a feature of the invention, each of the floor sections is connected to a gear segment and a rack section moving along the kiln floor successively meshes with the gear segments to turn them and the floor sections connected thereto.

According to a further feature of the invention, the floor sections are tilted through links connected thereto and to operating arms pivoted on the frame of the kiln floor and so arranged as to provide a toggle effect tending to hold the floor sections in closed position when they are closed. The operating arms are adjustably connected through adjustable limit stops to the gear segments which turn them.

The above and other objects and features of the invention will be more readily apparent from the following description when read in connection with the accompanying drawings, in which:

FIG. 1 is a partial side elevation with parts broken away of a malt house kiln floor embodying the invention;

FIG. 2 is an enlarged partial section on the line 2—2 of FIG. 1;

FIG. 3 is a perspective view of a floor section;

FIGS. 4, 5 and 6 are partial side elevations with parts in section showing the gear segment and rack mechanism in different positions;

FIG. 7 is a partial elevation with parts broken away showing the operating means for moving the racks;

FIG. 8 is a partial section on the line 8—8 of FIG. 1; and

FIG. 9 is a partial section on the line 9—9 of FIG. 2.

The kiln floor, as best seen in FIGS. 1 and 2, comprises a generally rectangular frame, indicated at 10, having vertical interconnected side and end panels open at the top and at the bottom. The lower part of the frame is closed by a floor of conventional construction comprising a series of floor sections indicated generally at 11 which extend in parallel side by side relationship across the frame to retain malt or similar products thereon. As best seen in FIG. 3, each floor section comprises a rectangular metallic frame 12 covered by a porous covering 13, such as screening or the like, to permit circulation of air through the material held on the floor for drying it.

The floor sections are pivotally mounted on axes 14, there preferably being a series of pillow blocks on the frame in which stub shafts carried by cross members on the frame are journalled. In this way each floor section can tilt about a longitudinal axis spaced slightly to one side of its center line from a horizontal closed position in which the edge of each section is in abutting relationship to the edges of adjacent sections to a tilted dumping position in which the floor sections are tilted to an upright, substantially vertical position so that material held thereon will slide therefrom to a collecting floor beneath the dumping floor. As seen in FIG. 2, sealing strips 14' may be provided on the inner surfaces of the frame end walls to engage the ends of the floor section frames 12 thereby preventing malt or similar material from falling between the ends of the main frame and the ends of the floor sections.

According to the present invention, the floor sections are tilted successively between their horizontal holding positions and their tilted dumping positions. For this purpose, as best seen in FIG. 2, a shaft 15 extends across the main frame beneath each of the floor sections and is journalled at its ends in bearings 16 carried by the end walls of the frame 10. Intermediate bearings are preferably also provided at one or more spaced points. At one side of the frame 10, the shaft extends beyond the frame and is secured, as by pinning, to a lever arm 17. Each lever arm 17, as best seen in FIG. 8, is provided with inturned ears 18 at its opposite edges through which are threaded stop screws 19 for adjusting movement of the floor sections, as will be described more fully hereinafter. Pivotally mounted on the end of each shaft 15 adjacent to the arm 17 is a gear segment 21. Each gear segment, as best seen in FIG. 4, is of skeleton construction with outer arms at an angle to each other and with a central arm carrying a projecting stop 22, as seen in FIG. 8, which lies between adjusting screws 19. By adjusting the screws 19 the angular relationship of each arm and its adjacent gear segment can be accurately adjusted and clearance for lost motion can be provided between the segment and arm when desired to determine the amount of turning of the interconnected floor section.

The gear segments are successively turned by a rack member, indicated generally at 23, which is mounted for movement in a track 24 extending along the side of the frame 10 adjacent to the gear segments. As best seen in FIG. 2, the track 24 is made up of two channel section strips supported in facing relationship and the rack member carries rollers 25 which fit into the channel strips respectively to guide the rack member for movement. As best seen in FIGS. 4, 5 and 6, the rack member is made up of a central portion 26 having a longitudinal opening 26a therethrough and formed at its lower edge with rack teeth complementary to the teeth on the gear segments 21. At each end the rack member is provided with a pivoted tooth bar 27 pivoted at its upper end to the rack member and extending downwardly along the end of the main section 26 thereof. Each tooth bar 27 is formed with a slot 27a therethrough terminating at the outer face of the bar in a cylindrical socket. A spring 30 in the opening 26a has rods 30a at its ends which extend loosely through the slots 27a. Semi-cylindrical bearing members 30b are adjustably secured to the rods 30a and seat in the sockets on the outer faces of the bars 27 so that the spring 30 will urge the bars flat against the ends of the rack member 26 as shown in FIG. 5.

The rack member is adapted to be moved along the rack 24 by means of a cable 28 which is secured intermediate its ends to the rack member and which may be wound at its ends on power operated drums thereby to move the rack member in one direction or the other. The rack member is depressed intermediate its ends at its upper surface and a clamping block 29 is screwed to the top of the rack member and securely grips the cable to the rack member. As seen best in FIGS. 1 and 7, the opposite ends of the cable are wound on drums 31 and 32 which are rotatably mounted in a frame 33' at one end of the kiln floor. One or the other of the drums may be driven through a reversible driving mechanism shown as comprising a driving pinion 33 connected to each of the drums and a pinion 34 adapted to engage the pinions 33 selectively to drive them. The pinion 34 is carried by a control lever 35 pivoted on an axis 36. A main driving pinion 37 concentric with the axis 36 and driven by an electrically reversible speed reducer, drivably engages the pinion 34 to drive it. When the control lever 35 is swung downwardly, as shown in FIG. 1, it will move the pinion 34 into driving engagement with the lower pinion 33 to drive the drum 31. At this time, the lower run of the cable 28 will be wound onto the lower drum 31 thereby causing the rack member to move to the right. When the control lever 35 is swung upward, as shown in FIG. 7, and the direction of the driving motor is reversed the pinion 34 will engage the upper pinion 33 to drive the upper drum 32. At this time, the cable will be wound on the upper drum thereby to move the lower run of the cable to the left, it being understood that the cable is looped over an idler drum at the opposite end of the floor frame. Therefore the rack member will be moved to the left, as seen in the drawings.

Turning of the arms 17 will successively turn the floor sections to which the arms are respectively connected. As best seen in FIGS. 1 and 2, each shaft 15 carries several lever arms 38 at spaced points in its length extending radially therefrom and secured thereto, by welding. A link 39 is pivoted to the outer end of each lever arm 38 and to the adjacent floor section 11 at a point spaced from its pivotal axis. In this way, as the shafts 15 are turned the lever arms 38 and links 39, which form in effect a toggle mechanism, will move to different positions to tilt the floor sections. The links 39 may be made adjustable as seen in FIG. 2 so that the floor sections can be aligned accurately and adjustable stops may be provided thereon to engage arms 36 and limit relative pivoting to a slightly overcenter locked position.

When a floor section is in its horizontal closed position, as seen at the right in FIG. 1, the lever arm 38 and link 39 associated with that floor section lie in the overcenter locked position. A load on the unbalanced floor section tending to tilt it will hold the arms 38 and links 39 in their locked positions against any accidental release due to vibration. When the shaft 15 and arms 17 are turned clockwise, as seen at the left in FIG. 1, the link 37 will pull the left end of the connected floor section downwardly thereby tilting the floor section to a substantially vertical position so that material held thereon will be dumped. Unbalanced pivoting of the floor section lessens the force required to tilt them to the dumping position and also caused them to remain in their tilted dumping positions by gravity. Suitable stops, not shown, may be provided to limit tilting of the floor sections toward their dumping positions.

In use of the floor, the floor sections are all in their horizontal holding positions so that the floor may be loaded with barley sprouts, or other material to be dried. At this time, the rack member 23 is moved to the extreme left of the floor section frame and the several gear segments and arms 17 are tilted counterclockwise from a vertical position, as shown at the right of FIG. 1. When the material on the kiln floor has been dried and is to be dumped, the control lever 35 is moved downward so that the cable 28 will be wound on the lower drum 31 and will move the rack member to the right. As the rack member moves to the right the end tooth bar 27 at the right end thereof will engage in the end tooth of each gear segment, as shown in FIG. 4, and will start to turn the gear segments clockwise. When the last tooth on the fixed part 26 of the gear member has left the gear segment, as shown in FIG. 6, the spring loaded bar 27 at the left end of the rack member will swing outwardly to clear the last tooth of gear segment and, because of the spring tension, force the gear segment and floor section to its ultimate position. In this way, the last tooth at the left end of the gear segment is left in a position to be engaged by the first tooth at the left end of the rack member when the rack member returns to the left. This insures that each gear segment will be turned through the full desired arc upon each movement of the rack member without any possibility of the rack member simply moving over the gear segment without turning it.

As the rack member moves from left to right, as seen in FIG. 1, it will successively turn the gear segments 21 thereby successively turning the floor sections from their horizontal holding to their tilted dumping positions. Upon completion of the travel when the rack member has reached the right end of the floor frame all of the frame sections will have been tilted to their dumping position and the material contained on the floor will have been dumped therefrom.

To reset the floor to receive a new batch of material, the control lever 35 is swung upward to drive the upper drum 32 so that the rack member will be moved to the left. As this occurs, the rack member will turn the gear segments successively counterclockwise in the same manner as described above with the tooth bar 27 at the right side of the rack member swinging outward to leave the gear segments in the position shown in FIG. 4 and at the right of FIG. 1. This operation will successively turn the floor sections from their tilted dumping positions back to their horizontal positions and securely lock them in that position by moving the toggle linkages to their overcenter locked positions ready to receive an additional batch of material to be dried.

While one embodiment of the invention has been shown and described herein, it will be understood that it is illustrative only and not to be taken as a definition of the scope of the invention, reference being had for this purpose to the appended claims.

What is claimed is:

1. A malt house kiln floor comprising an elongated rectangular frame, a plurality of floor sections extending across the frame in parallel side by side relationship, means mounting the floor sections for turning about axes extending lengthwise thereof for dumping material which is on the floor sections onto a collecting floor, a gear segment connected to each of the floor sections to turn it, and a rack section movable lengthwise of the frame and successively meshing with the gear segments as it moves to turn the sections successively about their axes.

2. A malt house kiln floor comprising an elongated rectangular frame, a plurality of floor sections extending across the frame in parallel side by side relationship, means mounting the floor sections for turning about axes extending lengthwise thereof for dumping material which is on the floor sections onto a collecting floor, a gear segment connected to each of the floor sections to turn it, a track carried by the frame extending longitudinally thereof adjacent to the gear segments, a rack member movable along the track and meshing successively with the gear segments to turn them and the floor sections connected to them, and means to move the rack member along the track.

3. The malt house kiln floor of claim 4 in which the rack member comprises a central toothed section, end bars pivoted to the ends of the central section and defining end teeth for the rack member, and spring means urging the bars against the ends of the central section, the bars being swingable away from the central section but engaging the ends of the central section to limit movement thereof toward the central section to a position in which the end teeth are spaced from the adjacent teeth a distance equal to the spacing of the teeth on the central section.

4. A malt house kiln floor comprising an elongated rectangular frame, a plurality of floor sections extending across the frame in parallel side by side relationship, means mounting the floor sections for turning about axes extending lengthwise thereof for dumping material which is on the floor sections onto a collecting floor, an operating arm pivoted on the frame adjacent to one end of each floor section, means connecting each operating arm to the adjacent floor section to tilt it, a gear segment pivoted on the frame coaxially with each operating arm, means providing an adjustable lost motion connection between the arm and the gear segment, and a rack member movable longitudinally of the frame and successively meshing with the gear segments to turn them as it moves.

5. A malt house kiln floor comprising an elongated rectangular frame, a plurality of floor sections extending across the frame in parallel side by side relationship, means mounting the floor sections for turning about axes extending lengthwise thereof for dumping material which is on the floor sections onto a collecting floor, an operating arm pivoted on the frame adjacent to one end of each floor section, a shaft connected to each operating arm to be turned thereby, a plurality of toggle arms secured to each shaft, a link connecting each toggle arm to the adjacent floor section for turning the floor section between its closed and open positions as the operating arm swings about its pivot, the pivotal connections between the link and the toggle arm and floor section being in an overcenter locked position when the floor section is in its closed position, a gear segment pivoted on the frame coaxially with each operating arm, means adjustably connecting each gear segment to the adjacent operating arm, a rack section movable along the frame into successive meshing engagement with the gear segments to turn them, and means to move the rack section.

6. A malt house kiln floor comprising an elongated rectangular frame, a plurality of floor sections extending across the frame in parallel side by side relationship, means mounting the floor sections for turning about axes extending lengthwise thereof for dumping material which is on the floor sections onto a collecting floor, a gear segment connected to each of the floor sections to turn it, a track carried by the frame extending longitudinally thereof adjacent to the gear segments, a rack member movable along the track and meshing successively with the gear segments to turn them and the floor sections connected to them, a sheave at one end of the frame, a pair of drums at the other end of the frame, a cable secured at its ends to the drums respectively and looped over the sheave and connected to the rack section, and means to drive the drums selectively to move the rack section in one direction or the other.

7. A malt house kiln floor comprising an elongated rectangular frame, a plurality of floor sections extending across the frame in parallel side by side relationship, means mounting the floor sections for turning about axes extending lengthwise thereof, a toggle linkage for moving each floor section including a toggle arm pivoted at one end and a link connecting the other end to a point on the floor section spaced from its axis, stop means to limit relative pivoting of the arm and link to an overcenter locked position when the adjacent floor section is in a horizontal holding position, a gear segment operatively connected to each toggle arm to turn it thereby to turn the adjacent floor section to a tilted dumping position, a rack movable along the frame and successively meshing with the gear segments to turn them, the rack including a central toothed section, end tooth bars pivoted at the ends of the central section, and a spring urging the bars toward the ends of the central section.

8. The malt house floor of claim 7 in which the floor sections are pivoted on axes spaced eccentrically of their widths and the toggle linkages are connected to the wider sides thereof to place the toggle linkages in compression due to load on the floor sections.

References Cited by the Examiner

UNITED STATES PATENTS

| | | | |
|---|---|---|---|
| 364,269 | 6/1887 | Lewandowski | 34—237 |
| 483,781 | 10/1892 | Giesler | 34—237 |
| 543,182 | 7/1895 | Hunt | 251—280 |
| 595,883 | 12/1897 | Macher et al. | 34—237 |
| 704,597 | 7/1902 | Toepfer | 34—237 |
| 850,214 | 4/1907 | Dornfeld | 34—237 |

FOREIGN PATENTS 197,507   5/1938   Switzerland.

WILLIAM F. O'DEA, *Primary Examiner.*

NORMAN YUDKOFF, *Examiner.*

F. E. DRUMMOND, B. L. ADAMS,
*Assistant Examiners.*